Feb. 15, 1949.  H. A. EINHART  2,461,725
CABLE CLAMP
Filed Feb. 14, 1947

Inventor
Harvey A. Einhart

By Clarence A. O'Brien
and Harvey B. Jacobson
Attorneys

Patented Feb. 15, 1949

2,461,725

UNITED STATES PATENT OFFICE 2,461,725

CABLE CLAMP

Harvey A. Einhart, Clyde, Ohio, assignor of thirty-three and one-third per cent to Myron Boyer and thirty-three and one-third per cent to Alexander Ray, both of Clyde, Ohio Application February 14, 1947, Serial No. 728,531

3 Claims. (Cl. 285—6.5)

This invention relates to new and useful improvements and structural refinements in cable clamps, more specifically, conduit box cable clamps, and the principal object of the invention is to provide a device of the character herein described, which may be conveniently and effectively employed for guiding and firmly securing an electrical cable to the conduit box with which it is associated.

A further object of the invention is to provide a cable clamp which will effectively prevent the cable from twisting or rubbing against the box, and the presence of which will not uselessly occupy a portion of the space in the box, whereby virtually the whole interior of the box will be available for the accommodation of wiring.

Another object of the invention is to provide a cable clamp which may be easily installed or removed, and which will readily accommodate cables of various sizes.

An additional object of the invention is to provide a cable clamp which is simple in construction, which will not easily become damaged, and which will readily lend itself to economical manufacture.

With the above and more important objects in view, and such other objects as may become apparent as this specification proceeds, the invention consists essentially of the arrangement and construction of parts as illustrated in the accompanying drawings, in which.

Like characters of reference are used to designate like parts in the specification and throughout the several views.

Figure 1:
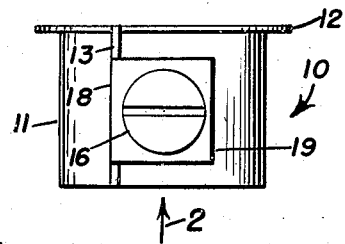
Figure 1 is a plan view of the invention.

Referring now to the accompanying drawings in detail, the invention consists of a cable clamp designated generally by the reference character 10, the same embodying in its construction an open ended sleeve 11 provided at one end thereof with an out turned flange 12 and formed with an open, longitudinally extending slot 13.

The lateral wall of the sleeve 11 is also formed with a screw threaded aperture 14, this receiving the shank of a clamping screw 15. The latter is equipped with a head 16 and the shank thereof terminates in a pointed extremity 17, as will be clearly apparent.

The mid-portion of a substantially U-shaped strip 18 is slidably positioned in the slot 13 and the outer end portion 19 of the strip is formed with an aperture 20 to rotatably receive the screw 15. The inner end portion 22 of the strip 18 is, in turn, formed with an indent 23 which provides what may be referred to as a seat for the pointed extremity 15. It will be noted that the surface of the end portion 22 disposed adjacent the lateral wall of the sleeve 11 is concave, as indicated at 24.

Figure 7:
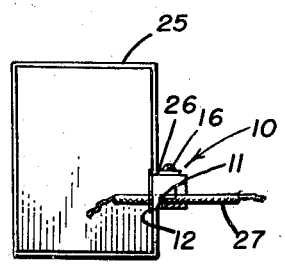
Figure 7 is an elevational view, partially broken away, showing the invention in use.

The conventional conduit box 25 is usually provided with one or more wire receiving apertures 26, and when the invention is placed in use, the sleeve 11 is positioned in the aperture 26 so that the flange 12 is disposed adjacent the inner surface of the box, as indicated in the accompanying Figure 7.

The cable or conductor 27 may then be passed through the sleeve 11 into the box 25, this being accomplished by positioning the cable between the strip portion 22 which functions as a pressure pad and the adjacent lateral wall of the sleeve. Thereupon, by simply tightening the screw 15, the pad 22 will be urged against the cable and the latter will thus be firmly secured in position.

Simultaneously with the tightening of the screw 15, the sleeve 11 will be caused to expand in the aperture 26 whereby the cable, together with the associated sleeve, will be rigidly held in the conduit box.

Figure 6:
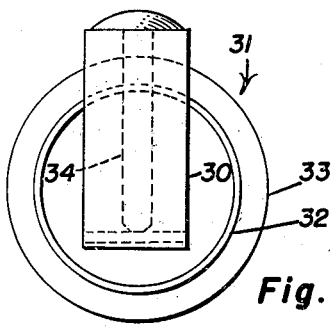
Figure 6 is an end view, similar to that shown in Figure 2, but illustrating a modified embodiment of the invention.
Figure 2:
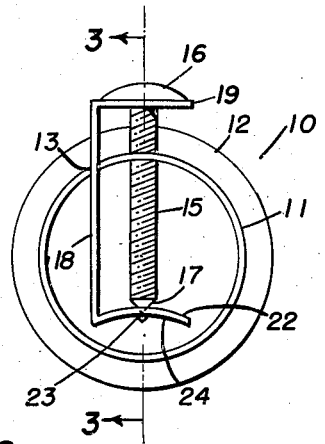
Figure 2 is an end view, taken in the direction of the arrow 2 in Figure 1.
Figure 3:
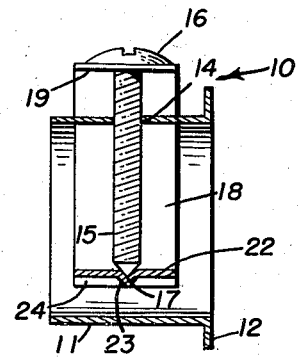
Figure 3 is a cross sectional view, taken substantially in the plane of the line 3—3 in Figure 2.
Figures 4, 5:
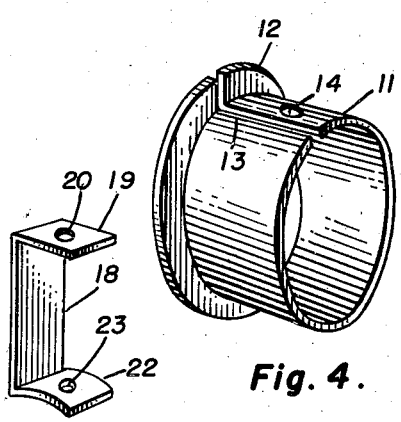
Figure 4 is a perspective view showing a sleeve used in the invention.
Figure 5 is a perspective view of a strip used in the same.

If desired, the strip 18 need not extend through the slot 13, but may be disposed adjacent the outer end of the sleeve 11, as indicated at 30 in the accompanying Figure 6.

This figure illustrates a modified embodiment of the invention designated generally by the reference character 31, the same being otherwise similar to the aforementioned clamp 10 and consisting of a split or slotted sleeve 32 provided with a flange 33 and equipped with a clamping screw 34, substantially as already described.

Attention is directed to the fact that the invention as shown in Figure 7 is disposed on the outside of the box 25, whereby the interior of the box is available for the accommodation of wiring. However, when this conservation of space is unnecessary, the sleeve 11 may extend into the box, while the flange 12 is disposed adjacent the box outer surface, as will be clearly apparent.

It is believed that the advantages and use of the invention will be clearly understood from the foregoing disclosure and accordingly, further description thereof at this point is considered unnecessary.

While in the foregoing there has been shown and described a preferred embodiment of this invention it is to be understood that minor changes in the details of construction, combination and arrangement of parts may be resorted to without departing from the spirit and scope of the invention as claimed.

What I claim as my invention is:

1. In association with a conduit box formed with a cable receiving aperture, a cable clamp comprising an open-ended sleeve receivable in said aperture and provided with an open, longitudinally extending slot, an outturned flange formed at one end of said sleeve, a clamping screw extending through the wall of said sleeve, and a substantially U-shaped strip operatively associated with said screw, said strip being slidable in said slot and one end portion thereof forming a pressure pad, said cable passing between the wall of said sleeve and said pad, and the tightening of said screw simultaneously urging said pad against said cable and expanding said sleeve in said aperture.

2. The device as defined in claim 1 in which the remaining end portion of said strip is formed with an aperture and said sleeve is formed with a screw-threaded aperture, both adapted to receive said screw, the shank extremity of said screw bearing against said pad.

3. In association with a conduit box formed with a cable receiving aperture, a cable clamp comprising an open-ended sleeve receivable in said aperture and provided with an open, longitudinally extending slot, an out-turned flange formed at one end of said sleeve, a headed clamping screw extending through the wall of said sleeve and having a pointed extremity, and a substantially U-shaped strip operatively associated with said screw, said strip having a web portion slidable in said slot, a top leg abutting the head of said screw, and a bottom arcuate leg having an opening therein for receiving the pointed extremity of said screw, said cable passing between the wall of said sleeve and said bottom leg, and the tightening of said screw simultaneously urging said bottom leg against the cable and expanding said sleeve in said aperture.

HARVEY A. EINHART.

REFERENCES CITED

The following references are of record in the file of this patent:

UNITED STATES PATENTS

| Number | Name | Date |
|---|---|---|
| 1,644,308 | Church | Oct. 4, 1927 |
| 2,134,655 | Tornblom | Oct. 25, 1938 |